(12) United States Patent
Suzuki

(10) Patent No.: US 10,800,211 B2
(45) Date of Patent: Oct. 13, 2020

(54) PNEUMATIC TIRE

(71) Applicant: The Yokohama Rubber Co., LTD., Minato-ku, Tokyo (JP)

(72) Inventor: Takumi Suzuki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 300 days.

(21) Appl. No.: 15/565,673

(22) PCT Filed: Mar. 14, 2016

(86) PCT No.: PCT/JP2016/057993
§ 371 (c)(1),
(2) Date: Oct. 10, 2017

(87) PCT Pub. No.: WO2016/163207
PCT Pub. Date: Oct. 13, 2016

(65) Prior Publication Data
US 2018/0079260 A1    Mar. 22, 2018

(30) Foreign Application Priority Data

Apr. 10, 2015   (JP) ................................. 2015-080986

(51) Int. Cl.
*B60C 11/11*   (2006.01)
*B60C 11/12*   (2006.01)
*B60C 11/03*   (2006.01)

(52) U.S. Cl.
CPC ...... *B60C 11/1236* (2013.01); *B60C 11/0302* (2013.01); *B60C 11/0304* (2013.01);
(Continued)

(58) Field of Classification Search
CPC ............. B60C 11/0304; B60C 11/1236; B60C 2011/0348; B60C 2011/0383; B60C 2011/0344
See application file for complete search history.

(56) References Cited

U.S. PATENT DOCUMENTS 2,272,879 A * 2/1942 Hargraves ........... B60C 11/0309
152/209.22
D493,767 S * 8/2004 Himuro ........................ D12/603
(Continued)

FOREIGN PATENT DOCUMENTS

EP    0618091 A1 * 10/1994 ............. B60C 11/12
JP    07164826 A * 6/1995
(Continued)

OTHER PUBLICATIONS

Machine Translation: JP-07164826-A; Nishigata, Hiroshi; (Year: 2019).*
(Continued)

*Primary Examiner* — Kendra Ly
(74) *Attorney, Agent, or Firm* — Thorpe North & Western

(57) ABSTRACT

A pneumatic tire includes a first block formed by first lug grooves defining a first land portion that is defined by a first main groove and a second main groove. The first block includes: a first circumferential narrow groove extending in the tire circumferential direction with at least one end communicating with one of the first lug grooves, a set of two lateral narrow grooves extending in the tire width direction with one end communicating with the first main groove, a first lateral auxiliary groove extending in the tire width direction with a first end communicating with the second main groove and a second end communicating with the first circumferential narrow groove, the second end of the first lateral auxiliary groove being disposed at a position in the tire circumferential direction between end portions of the set of first lateral narrow grooves proximal to the first circumferential narrow groove.

9 Claims, 5 Drawing Sheets

(52) U.S. Cl.
CPC ........... *B60C 11/0306* (2013.01); *B60C 11/11* (2013.01); *B60C 11/1204* (2013.01); *B60C 2011/0348* (2013.01); *B60C 2011/0358* (2013.01); *B60C 2011/0381* (2013.01); *B60C 2011/1209* (2013.01); *B60C 2011/1213* (2013.01)

(56) References Cited

U.S. PATENT DOCUMENTS

| | | |
|---|---|---|
| 2003/0226629 A1 | 12/2003 | Kimishima |
| 2006/0027296 A1 | 2/2006 | Tsubono et al. |
| 2009/0188596 A1* | 7/2009 | Kojima ............... B60C 11/0309 152/209.8 |
| 2012/0145295 A1 | 6/2012 | Yamada |
| 2012/0267022 A1 | 10/2012 | Tagashira |
| 2013/0133797 A1* | 5/2013 | Takagi ................... B60C 11/03 152/209.8 |

FOREIGN PATENT DOCUMENTS

| | | | |
|---|---|---|---|
| JP | 2003-326919 | | 11/2003 |
| JP | 2006-076556 | | 3/2006 |
| JP | 2008221955 A | * | 9/2008 |
| JP | 2009-214761 | | 9/2009 |
| JP | 2011-042260 | | 3/2011 |
| JP | 2012-006541 | | 1/2012 |
| JP | 2012-126214 | | 7/2012 |
| JP | 2012-224245 | | 11/2012 |
| JP | 2012-228981 | | 11/2012 |
| JP | 2013-107492 | | 6/2013 |

OTHER PUBLICATIONS

Machine Translation: JP-2008221955-A; Ebiko, Masahiro; (Year: 2020).*
Machine Translation: EP-0618091-A1; Liederer Werner Dr; (Year: 2020).*
International Search Report for International Application No. PCT/JP2016/057993 dated May 24, 2016, 4 pages, Japan.

* cited by examiner

PNEUMATIC TIRE

TECHNICAL FIELD

The present technology relates to a pneumatic tire and particularly relates to a pneumatic tire capable of improving braking performance on wet road surfaces and snowy road surfaces in a compatible manner and uneven wear resistance performance.

BACKGROUND ART

Generally, all-season pneumatic tires used all year round are required to have excellent running performance (for example, braking performance) on various road surfaces such as dry road surfaces, wet road surfaces, and snowy road surfaces, as well as having excellent uneven wear resistance performance. In the art, pneumatic tires designed to achieve good performance in a compatible manner in two areas among such various areas are known. Examples include a pneumatic tire that includes, in a tread surface, two circumferential grooves extending in the tire circumferential direction arranged side by side in the tire width direction, and lateral grooves disposed in land portions formed between the circumferential grooves, the lateral grooves extending in the tire width direction from the circumferential grooves.

For example, Japanese Unexamined Patent Application Publication No. 2012-126214A describes a pneumatic tire designed to improve the running performance on snowy road surfaces while maintaining the steering stability performance on dry road surfaces. The pneumatic tire includes two circumferential grooves formed in a land portion, and lateral grooves including narrow grooves and/or sipes that extend the entire width of the land portion, the lateral grooves having a zigzag shape. Japanese Unexamined Patent Application Publication No. 2013-107492A describes a pneumatic tire designed to achieve good drainage performance and steering stability performance in a highly compatible manner. The pneumatic tire includes two circumferential grooves; a land portion formed therebetween; first inclined grooves extending in the tire width direction at an incline from one of the circumferential grooves and terminating within the land portion; second inclined grooves extending in the tire width direction at an incline from the other circumferential groove and terminating within the land portion, the first inclined grooves and the second inclined grooves being alternately disposed in the tire circumferential direction; first circumferential sipes extending in the tire circumferential direction from the end portion of the first inclined groove in the land portion to an intermediate portion of the second inclined groove; and second circumferential sipes extending from the intermediate portion of the second inclined groove along an extension line of the first circumferential sipes and terminating within the land portion.

The pneumatic tires described in Japanese Unexamined Patent Application Publication Nos. 2012-126214A and 2013-107492A described above may achieve good performances in a compatible manner especially in terms of the two performances mentioned above. However, extending this to enhance another performance so that good performances in three areas are achieved in a compatible manner is difficult. In other words, in the pneumatic tire of Japanese Unexamined Patent Application Publication No. 2012-126214A, by arranging the lateral grooves across the whole width of the land portion with a zigzag shape, quadrangular blocks formed by two lateral grooves extending in the same direction are formed into triangular blocks by being divided at an incline by the lateral grooves extending in a different direction. Thus, the rigidity of the land portion decreases and the uneven wear resistance performance become insufficient. The pneumatic tire of Japanese Unexamined Patent Application Publication No. 2013-107492A includes the first circumferential sipes and the second circumferential sipes. However, as these sipes extend in the tire circumferential direction, the edge effect they provide is insignificant. As a result, the braking performance on snowy road surfaces is insufficient.

SUMMARY

The present technology provides a pneumatic tire capable of improving braking performance on wet road surfaces and snowy road surfaces in a compatible manner and uneven wear resistance performance.

A pneumatic tire according to an embodiment of the present technology includes:

a first main groove and a second main groove that extend in a tire circumferential direction formed in a tread portion side by side in a tire width direction;

a first land portion defined between the first main groove and the second main groove;

a plurality of first lug grooves that extend in the tire width direction disposed in the first land portion at intervals in the tire circumferential direction, each of the plurality of first lug grooves communicating with the first main groove and the second main groove at both ends; and a plurality of first blocks formed by the plurality of first lug grooves defining the first land portion;

each of the plurality of first blocks comprising:

a first circumferential narrow groove that extends in the tire circumferential direction with at least one end communicating with one of the first lug grooves, a set of two lateral narrow grooves that extend in the tire width direction with one end communicating with the first main groove, a first lateral auxiliary groove that extends in the tire width direction with a first end communicating with the second main groove and a second end communicating with the first circumferential narrow groove, the second end of the first lateral auxiliary groove being disposed at a position in the tire circumferential direction between end portions of the set of first lateral narrow grooves proximal to the first circumferential narrow groove.

In an embodiment of the present technology, as described above, in the first land portion, the first blocks defined by the first lug grooves are further divided by the first circumferential narrow grooves, the first lateral narrow grooves, and the first lateral auxiliary grooves. This can improve the snow traction and the braking performance on snowy road surfaces. Additionally, the drainage performance expected to be provided by the first circumferential narrow grooves, the first lateral narrow grooves, and the first lateral auxiliary grooves can improve wet performance. Furthermore, by the set of two lateral narrow grooves and the first lateral auxiliary groove being arranged as described above, a reduction in block rigidity can be suppressed, and uneven wear caused by a difference in rigidity between adjacent blocks can be suppressed.

In an embodiment of the present technology, the second main groove preferably has a smaller groove width than the first main groove. By setting the groove widths of the first main groove and the second main groove in such a manner, the rigidity of the land portions on either side of the second main groove can be ensured, and steering stability can be improved.

In an embodiment of the present technology, the set of lateral narrow grooves are preferably inclined so that a distance between one another increases from an end portion of the lateral narrow grooves proximal to the first main groove toward an end portion proximal to the first circumferential narrow groove, and form an angle α that ranges from 10° to 50°. By arranging the set of lateral narrow grooves in this manner, the lateral narrow grooves provide an effective edge effect. As a result, block rigidity is maintained, uneven wear is suppressed, and braking performance on snowy road surfaces is improved.

In an embodiment of the present technology, an angle β formed by the first circumferential narrow groove and the first lateral auxiliary groove is preferably 45° or greater. By the first circumferential narrow groove and the first lateral auxiliary groove being disposed in such a manner, the angle formed by the first circumferential narrow groove and the first lateral auxiliary groove is prevented from being too acute, and uneven wear caused by slipping can be suppressed.

In an embodiment of the present technology, in each of the plurality of first blocks, an area of a region with the largest area out of five regions divided by the first circumferential narrow groove, the set of lateral narrow grooves, and the first lateral auxiliary groove is preferably equal to or less than 1.7 times an area of a region with the smallest area. By dividing the block in such a manner, the difference in rigidity between adjacent blocks is reduced, and uneven wear can be suppressed.

An embodiment of the present technology preferably further includes:

a third main groove that extends in the tire circumferential direction at a position outward from the second main groove in the tire width direction, the third main groove having a larger groove width than the second main groove;

a second land portion defined between the second main groove and the third main groove disposed side by side in the tire width direction;

a plurality of second lug grooves that extend in the tire width direction disposed in the second land portion at intervals in the tire circumferential direction, each of the plurality of second lug grooves communicating with the second main groove and the third main groove at both ends;

a plurality of second blocks formed by the plurality of second lug grooves defining the second land portion, each of the second blocks including:

a second lateral auxiliary groove that extends in the tire width direction with one end communicating with the second main groove. By providing the second lateral auxiliary groove in the second block formed by further providing the third main groove and the second lug grooves, drainage performance provided by the second lateral auxiliary groove can be obtained while the rigidity of the second blocks can be maintained and wet performance can be improved. By the first lateral auxiliary groove and the second lateral auxiliary groove opening to the second main groove disposed on the outer side with respect to the vehicle when the tire is mounted on the vehicle, wet performance can be increased.

In this embodiment, each of the plurality of second blocks preferably includes a second circumferential narrow groove that extends in the tire circumferential direction and intersects the second lateral auxiliary groove. By further providing the second circumferential auxiliary groove, the rigidity of the second blocks is brought close to that of the first blocks with the difference in rigidity between first blocks and second blocks adjacent in the tire width direction decreasing. As a result, the ground contact pressure of the first blocks and the second blocks can be made uniform and uneven wear can be suppressed.

In an embodiment of the present technology, the first main groove is preferably disposed on an inner side of the second main groove with respect to a vehicle when the tire is mounted on the vehicle. By disposing the first main groove and the second main groove in such a manner, the rigidity of the land portions on either side of the second main groove on the outer side with respect to the vehicle when the tire is mounted on the vehicle can be ensured, and steering stability can be further effectively improved.

Note that in an embodiment of the present technology, the narrow grooves are fine grooves with a groove width of from 0.4 mm to 1.5 mm, for example. Additionally, the auxiliary grooves are grooves with a groove width greater than that of the narrow grooves of 1.6 mm or greater, for example, but less than that of the main grooves.

In an embodiment of the present technology, the angle formed by two grooves (for example, the angle α formed by the set of lateral narrow grooves or the angle β formed by the first circumferential narrow groove and the first lateral auxiliary groove) are measured using a straight line (reference line) that connects the midpoint in the groove width direction at the starting point of the groove and the midpoint in the groove width direction at the end point of the groove.

DETAILED DESCRIPTION

Configurations according to embodiments of the present technology are described below in detail with reference to the accompanying drawings.

Figure 1:
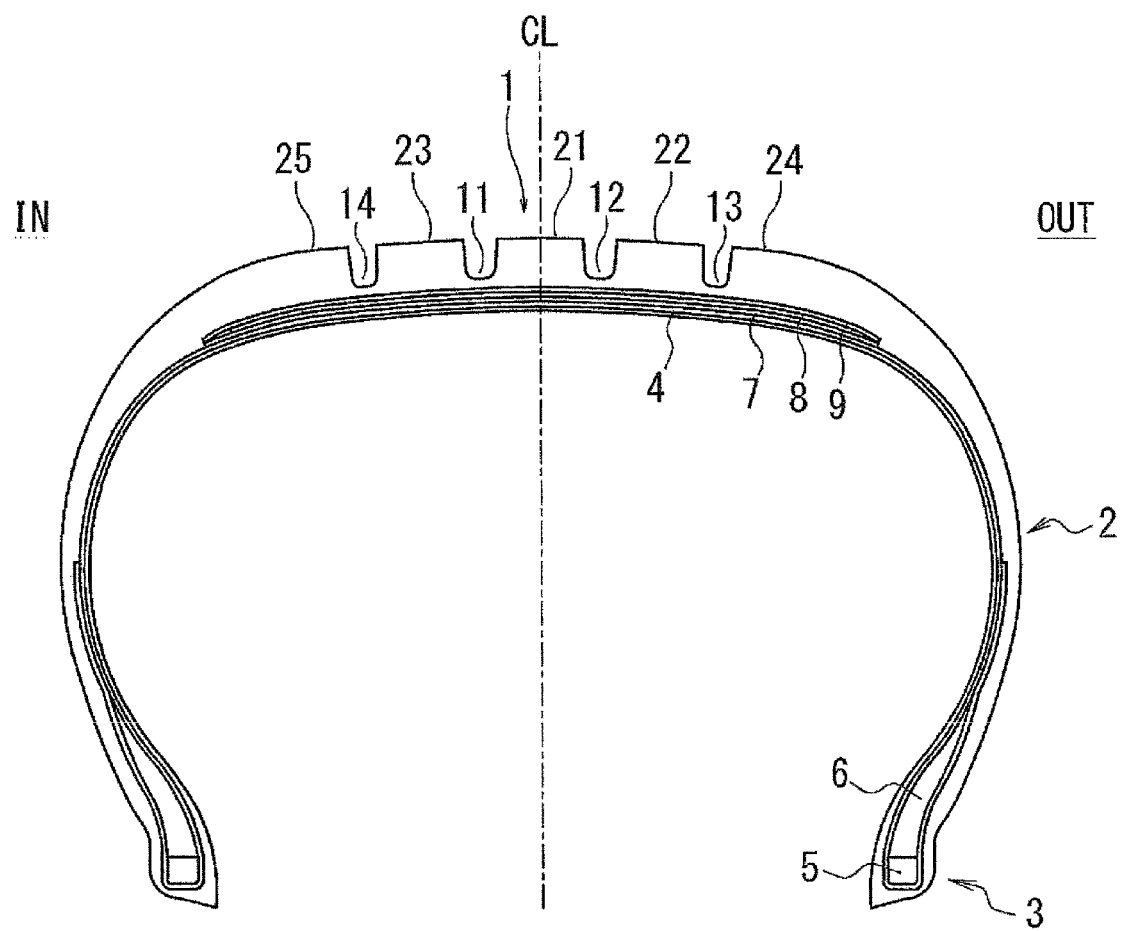
FIG. 1 is a meridian cross-sectional view of a pneumatic tire according to an embodiment of the present technology.

The reference sign CL in FIG. 1 denotes the tire equator. A pneumatic tire according to an embodiment of the present technology includes an annular tread portion 1 that extends in the tire circumferential direction, a pair of sidewall portions 2 disposed on both sides of the tread portion 1, and a pair of bead portions 3 disposed inward of the sidewall portions 2 in the tire radial direction.

A carcass layer 4 extends between the left-right pair of bead portions 3. The carcass layer 4 includes a plurality of reinforcing cords extending in a tire radial direction, and is folded back around a bead core 5 disposed in each bead portion 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. In the tread portion 1, a plurality of belt layers 7, 8 (two layers in FIG. 1) are embedded on the outer circumferential side of the carcass layer 4. Each belt layer 7, 8 includes a plurality of reinforcing cords inclined with respect to the tire circumferential direction, the direction of the reinforcing cords of the different layers intersecting with each other. In the belt layers 7, 8, the inclination angle of the reinforcing cords with respect to the tire circumferential direction is set in the range, for example, of 10° to 40°. In addition, a belt reinforcing layer 9 is provided on the outer circumferential side of the belt layers 7, 8. The belt reinforcing layer 9 includes organic fiber cords oriented in the tire circumferential direction. In the belt reinforcing layer 9, the angle of the organic fiber cords with respect to the tire circumferential direction is set, for example, to from 0° to 5°.

The present technology may be applied to such a general pneumatic tire; however, the cross-sectional structure thereof is not limited to the basic structure described above.

Figure 2:
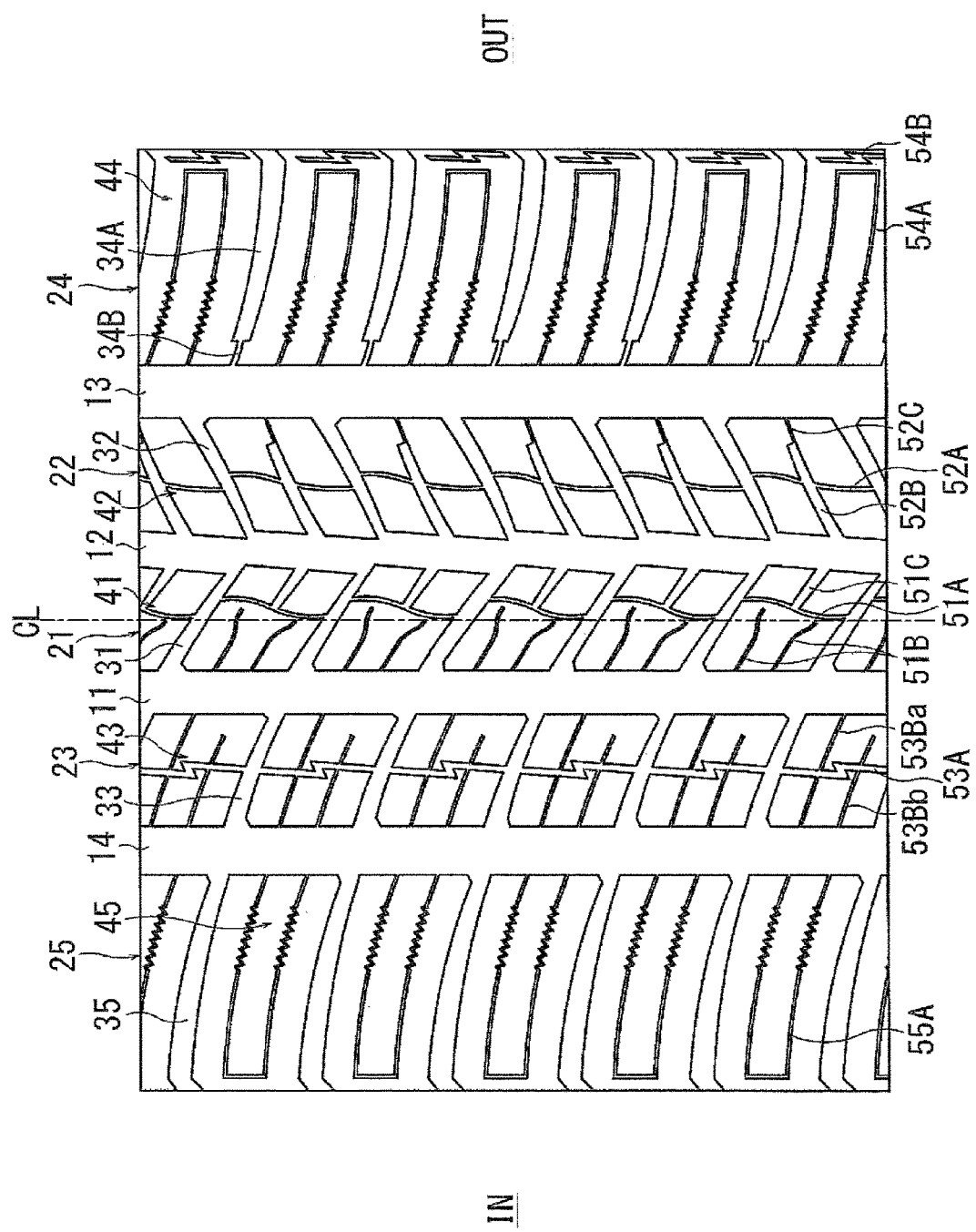
FIG. 2 is a front view illustrating a tread surface of a pneumatic tire according to an embodiment of the present technology.

In the embodiment illustrated in FIG. 2, a first main groove 11 and a second main groove 12 are provided in the tread portion 1 on either side of the tire equator CL of the tread portion 1 in the tire width direction. Additionally, a third main groove 13 is disposed outward of the second main groove 12 in the tire width direction and a fourth main groove 14 is disposed outward of the first main groove 11 in the tire width direction. A first land portion 21 is defined by the first main groove 11 and the second main groove 12, a second land portion 22 is defined by the second main groove 12 and the third main groove 13, and a third land portion 23 is defined by the first main groove 11 and the fourth main groove 14. Additionally, shoulder land portions 24, 25 are disposed outward of the third main groove 13 and the fourth main groove 14 located outermost in the tire width direction and defined thereby. Note that in the example illustrated, the outer shoulder land portion 24 is disposed on the outer side with respect to the vehicle (OUT side in the drawing) when the tire is mounted on the vehicle, and the inner shoulder land portion 25 is disposed on the inner side with respect to the vehicle (IN side in the drawing) when the tire is mounted on the vehicle.

In the first land portion 21, a plurality of first lug grooves 31 that extend in the tire width direction and communicate with the first main groove 11 and the second main groove 12 at both ends are disposed at intervals in the tire circumferential direction. The first land portion 21 is defined into a plurality of first blocks 41 by the plurality of first lug grooves 31. In the second land portion 22, a plurality of second lug grooves 32 that extend in the tire width direction and communicate with the second main groove 12 and the third main groove 13 at both ends are disposed at intervals in the tire circumferential direction. The second land portion 22 is defined into a plurality of second blocks 42 by the plurality of second lug grooves 32. In a similar manner, in the third land portion 23, a plurality of third lug grooves 33 that extend in the tire width direction and communicate with the first main groove 11 and the fourth main groove 14 at both ends are disposed at intervals in the tire circumferential direction. The third land portion 23 is defined into a plurality of third blocks 43 by the plurality of third lug grooves 33.

Furthermore, in the outer shoulder land portion 24, a plurality of outer shoulder lug grooves 34A that extend in the tire width direction are disposed at intervals in the tire circumferential direction. The outer shoulder lug grooves 34A terminate within the land portion at the inner end portion in the tire width direction and open outward in the tire width direction at the outer end portion in the tire width direction. In the outer shoulder land portion 24, outer shoulder auxiliary grooves 34B that link the terminating ends of the outer shoulder lug groove 34A located inward in the tire width direction and the main groove (third main groove 13) are disposed. Additionally, the outer shoulder land portion 24 is defined into a plurality of outer shoulder blocks 44 by the plurality of outer shoulder lug grooves 34A and the outer shoulder auxiliary grooves 34B. In the inner shoulder land portion 25, a plurality of inner shoulder lug grooves 35 that extends in the tire width direction are disposed at intervals in the tire circumferential direction. The inner shoulder lug grooves 35 communicate with the main groove (fourth main groove 14) at the inner end portion in the tire width direction and open outward in the tire width direction at the outer end portion in the tire width direction. The inner shoulder land portion 25 is defined into a plurality of inner shoulder blocks 45 by the plurality of inner shoulder lug grooves 35.

A first circumferential narrow groove 51A that extends in the tire circumferential direction, a first lateral narrow groove 51B that extends in the tire width direction, and a first lateral auxiliary groove 51C that extends in the tire width direction are formed in each of the first blocks 41. The first circumferential narrow groove 51A communicates with the first lug groove 31 at at least one end (both ends in the example illustrated). Additionally, in the example illustrated, the first circumferential narrow groove 51A extends while curving with respect to the tire circumferential direction. The first lateral narrow groove 51B is formed as a set of two grooves, both communicating with the first main groove 11 at a first end. Note that in the example illustrated, the second end of the first lateral narrow groove 51B does not communicate with the first circumferential narrow groove 51A described above and terminates within the first block 41. The first lateral auxiliary groove 51C communicates with the second main groove 12 at a first end and communicates with the first circumferential narrow groove 51A at a second end. Additionally, the second end of the first lateral auxiliary groove 51C (the end portion on the side that communicates with the first circumferential narrow groove 51A) is disposed at a position in the tire circumferential direction between the end portions of the set of the lateral narrow grooves 51B described above proximal to the first circumferential narrow groove 51A.

A second circumferential narrow groove 52A that extends in the tire circumferential direction, and a second lateral auxiliary groove 52B that extends in the tire width direction are formed in each of the second blocks 42. Additionally, in the example illustrated, a second lateral narrow groove 52C that extends in the tire width direction from the end portion of the second lateral auxiliary groove 52B is provided. The second circumferential narrow groove 52A communicates with the second lug groove 32 at one end (both ends in the example illustrated). Additionally, in the example illustrated, the second circumferential narrow groove 52A extends while curving with respect to the tire circumferential direction. The second lateral auxiliary groove 52B communicates with the second main groove 12 at a first end and terminates within the second block 42 at the second end. The second lateral narrow groove 52C communicates with the terminating end of the second lateral auxiliary groove 52B on one side, extends in the extending direction of the second lateral auxiliary groove 52B, and communicates with the third main groove 13 at the other end.

A third circumferential auxiliary groove 53A that extends in the tire circumferential direction, and a third lateral narrow groove 53B that extends in the tire width direction are formed in each of the third blocks 43. The third circumferential auxiliary groove 53A communicates with the third lug grooves 33 at both ends. Additionally, in the example illustrated, the third circumferential auxiliary groove 53A extends with a zigzag shape bending at a partway portion in the tire circumferential direction. The third lateral narrow groove 53B is formed as a set of two grooves, a third lateral narrow groove 53Ba and a third lateral narrow groove 53Bb. The third lateral narrow groove 53Ba communicates with the fourth main groove 14 and the first main groove 11 at both ends. The third lateral narrow groove 53Bb communicates with the fourth main groove 14 at one end and terminates within the third block 43 without reaching the first main groove 11 at the other end. The set of third lateral narrow grooves 53B both intersect the third circumferential auxiliary groove 53A. In particular, as in the example illustrated, the third lateral narrow groove 53Ba and the third lateral narrow groove 53Bb intersect with two linear portions positioned on either side in the tire circumferential direction of a bent-back portion (portion that extends in a linear manner) of the third circumferential auxiliary groove 53A.

Outer shoulder narrow grooves 54A are disposed in the outer shoulder blocks 44. The outer shoulder narrow grooves 54A each include two portions that extend in the tire width direction and communicate with the third main groove 13 at one end and terminate within the outer shoulder land portion at the other end, and a portion that extends in the tire circumferential direction in a manner so that the other ends of the two portions are joined. The portions that extend in the tire width direction each include a zigzag shaped region on the surface of the outer shoulder block 44. Furthermore, an outer groove 54B is disposed outward in the tire width direction of the portion that extends in the tire circumferential direction. The outer groove 54B extends in the tire circumferential direction with a zigzag shape bending at a partway portion in the tire circumferential direction, does not communicate with the outer shoulder lug grooves 34A at either end and terminates within the outer shoulder block 44.

In a similar manner, outer shoulder narrow grooves 55A are disposed in the inner shoulder blocks 45. The outer shoulder narrow grooves 55A each include two portions that extend in the tire width direction and communicate with the fourth main groove 14 at one end and terminate within the outer shoulder land portion at the other end, and a portion that extends in the tire circumferential direction in a manner so that the other ends of the two portions are joined. The portions that extend in the tire width direction each include a zigzag shaped region on the surface of the inner shoulder block 45.

In an embodiment of the present technology, as described above, in the first land portion 21, the first blocks 41 defined by the first lug grooves 31 are further divided by the first circumferential narrow grooves 51A, the first lateral narrow grooves 51B, and the first lateral auxiliary grooves 51C. The edge effect provided by these grooves can improve the snow traction and the braking performance on snowy road surfaces. Additionally, the drainage performance expected to be provided by the first circumferential narrow grooves 51A, the first lateral narrow grooves 51B, and the first lateral auxiliary grooves 51C can improve wet performance. Furthermore, by the set of two first lateral narrow grooves 51B and the first lateral auxiliary groove 51C being arranged as described above, a reduction in block rigidity can be suppressed, and uneven wear caused by a difference in rigidity between adjacent blocks can be suppressed.

In such a configuration, by at least one end of the first circumferential narrow groove 51A communicating with a first lug groove 31, the effect described above can be obtained, and preferably both ends communicate with the first lug grooves 31 as illustrated. When the first circumferential narrow groove 51A terminates within the first block 41 without communicating to the first lug grooves 31, sufficient snow traction and drainage performance is not obtained. Additionally, the first circumferential narrow groove 51A may extend in the tire circumferential direction in a linear manner. However, by extending in a curved manner as illustrated, a more effective edge effect can be obtained, which is advantageous in improving snow performance.

As described above, the first lateral narrow groove 51B is a set of two grooves. When only one was provided, the first blocks 41 are not sufficiently divided, which makes sufficiently improving snow traction difficult. When three or more first lateral narrow grooves 51B are provided, the first blocks 41 are too narrowly divided. As a result, block rigidity significantly decreases, and the desired effect cannot be obtained.

Figure 3:
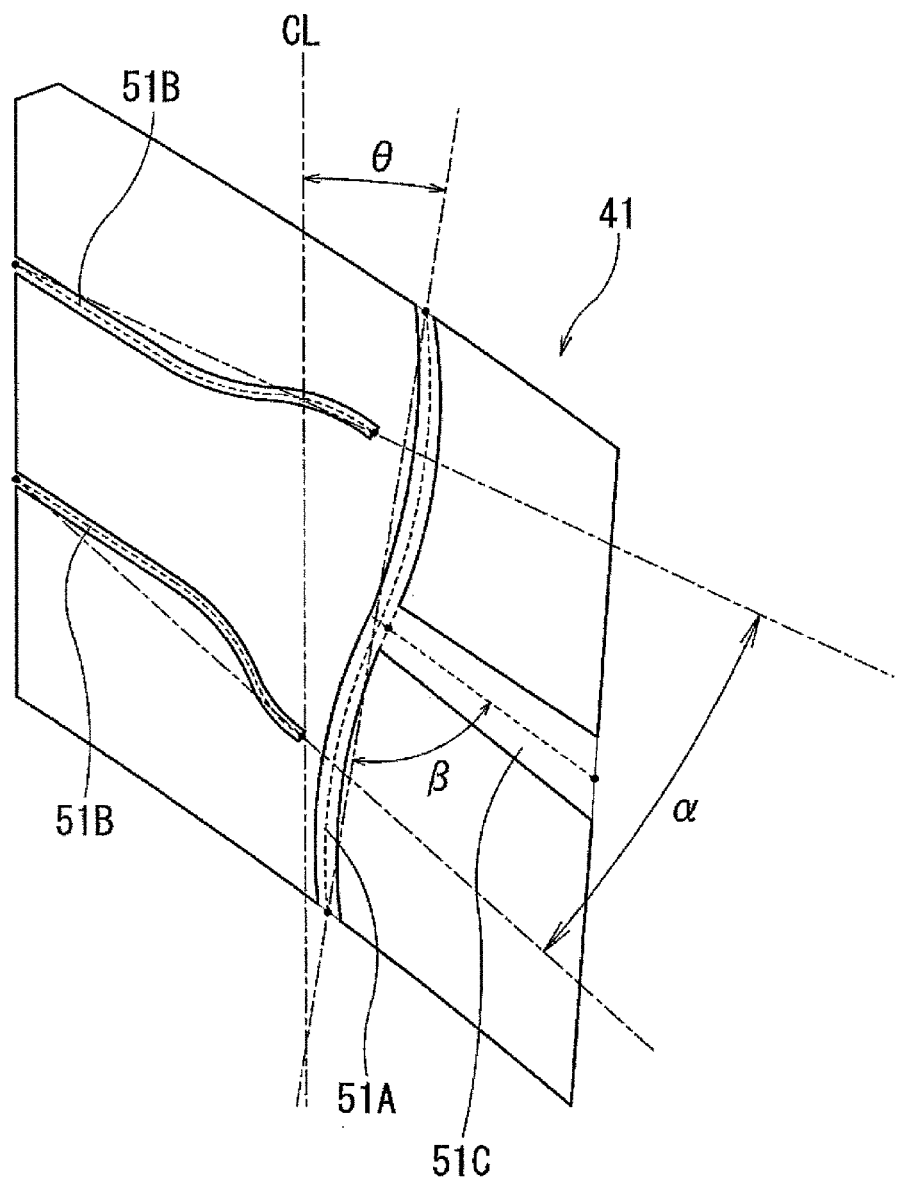
FIG. 3 is an explanatory diagram illustrating an enlarged first land portion illustrated in FIG. 2.
Figure 4:
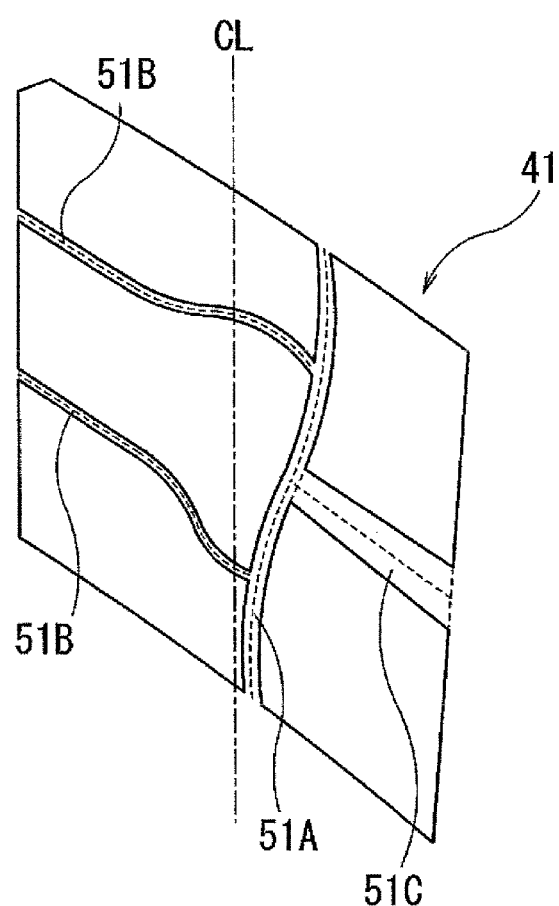
FIG. 4 is an explanatory diagram illustrating an enlarged first land portion of a pneumatic tire according to another embodiment of the present technology.

As illustrated in FIGS. 2 and 3, the first lateral narrow grooves 51B may terminate within the first block 41 without communicating with the first circumferential narrow groove 51A. However, they preferably communicate with the first circumferential narrow groove 51A as illustrated in FIG. 4. In this configuration, the first circumferential narrow groove 51A, the first lateral narrow groove 51B, and the first lateral auxiliary groove 51C are connected. This improves the flow of water between the grooves, and further improves drainage performance.

The set of first lateral narrow grooves 51B are preferably inclined so that the distance between one another increases from the end portion proximal to the first main groove 11 toward the end portion proximal to the first circumferential narrow groove 51A. Specifically, an angle α formed by the set of first lateral narrow grooves 51B preferably ranges from 10° to 50°. By arranging the set of first lateral narrow grooves 51B in this manner, the first lateral narrow grooves 51B provides an effective edge effect. As a result, block rigidity is maintained, uneven wear is suppressed, and braking performance on snowy road surfaces is improved. When the angle α is less than 10°, the set of first lateral narrow grooves 51B are substantially parallel. This makes a decrease in land portion rigidity difficult to sufficiently suppress. When the angle α is greater than 50°, at least one of the first lateral narrow grooves 51B is too closely orientated with the tire circumferential direction, making an appropriate edge effect difficult to obtain.

To provide an effective edge effect, the set of first lateral narrow grooves 51B are preferably curved as illustrated. Specifically, in the example illustrated, the first lateral narrow grooves 51B each include a portion that extends in a linear manner and communicates with the first main groove 11, a portion that communicates with this portion and curves with a convex shape facing one way in the tire circumferential direction of the first block 41, and a portion that communicates with the end of this portion and curves with a convex shape facing an opposite way in the tire circumferential direction of the first block 41.

The first lateral auxiliary groove 51C extends in a linear manner in the tire width direction and does not curve like the first circumferential narrow groove 51A or the first lateral narrow grooves 51B. The first lateral auxiliary groove 51C has a groove width that gradually increases as it extends from inner end portion in the tire width direction of the first block 41 toward the outer end portion in the tire width direction. By having such a shape, good drainage performance can be obtained.

As described above, the first lateral auxiliary groove 51C communicates with the first circumferential narrow groove 51A and is disposed at a position in the tire circumferential direction between the end portions of the set of first lateral narrow grooves 51B proximal to the first circumferential narrow groove 51A. When the first lateral auxiliary groove 51C is disposed in the tire circumferential direction of end portions of the first lateral narrow grooves 51B proximal to the first circumferential narrow groove 51A, at least one of the portions of the first block 41 defined by the first lateral auxiliary groove 51C becomes excessively small. As a result, the rigidity of this portion decreases, and uneven wear becomes difficult to suppress.

At the point where the first lateral auxiliary groove 51C and the first circumferential narrow groove 51A communicate, an angle β formed by the first circumferential narrow groove 51A and the first lateral auxiliary groove 51C can be set to 45° or greater, for example. By the first circumferential narrow groove 51A and the first lateral auxiliary groove 51C being disposed in such a manner, the corner portion formed by the first circumferential narrow groove 51A and the first lateral auxiliary groove 51C is prevented from being too acute, and uneven wear caused by slipping can be suppressed. When the angle β is less than 45°, the corner portion formed by the first circumferential narrow groove 51A and the first lateral auxiliary groove 51C becomes significantly acute, which makes uneven wear difficult to suppress.

Three types of grooves, the first circumferential narrow groove 51A, the set of two first lateral narrow grooves 51B, and the first lateral auxiliary groove 51C described above, are formed in the first block 41. If any one of these grooves are missing, then the effects described above cannot be sufficiently obtained.

Figure 5:
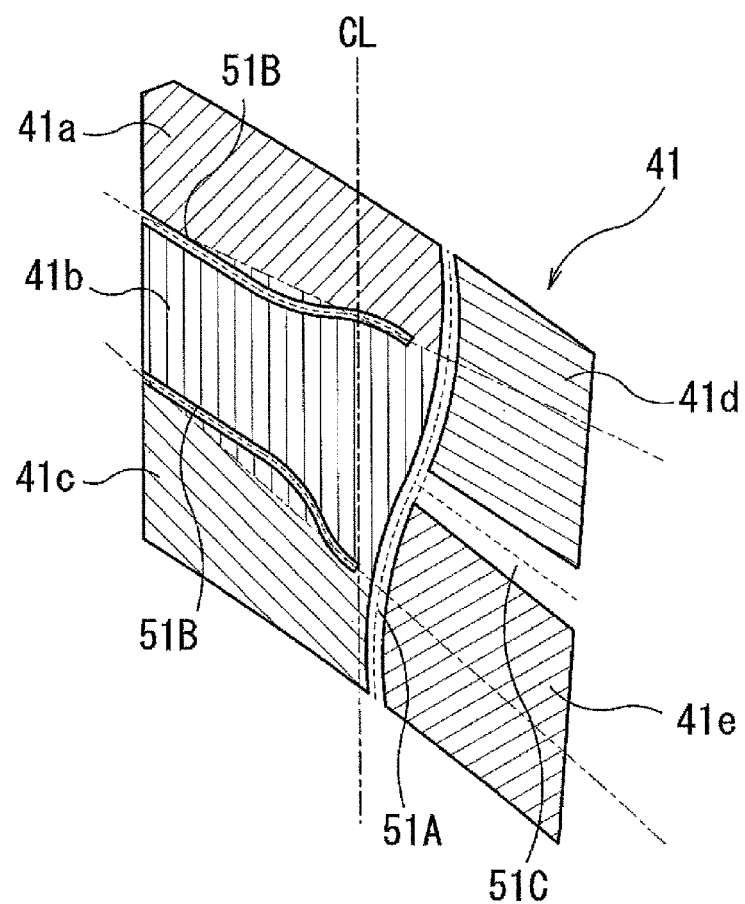
FIG. 5 is an explanatory diagram illustrating a region divided by the first land portion.

The first block 41 is divided into five regions 41a, 41b, 41c, 41d, 41e as illustrated (see FIG. 5) by the first circumferential narrow groove 51A, the set of two first lateral narrow grooves 51B, and the first lateral auxiliary groove 51C as described above. The region out of the five regions with the largest area (region 41b in the example illustrated) preferably has an area 1.7 times the area of the region with the smallest area (region 41d in the example illustrated). By dividing the first block 41 appropriately in such a manner, the difference in rigidity between adjacent blocks is reduced, and uneven wear can be effectively suppressed. When the area of the region with the largest area is greater than 1.7 times the area of the region with the smallest area, the difference in rigidity between adjacent blocks increases significantly, and uneven wear becomes difficult to suppress. Note that the five regions 41a, 41b, 41c, 41d, 41e are determined in a manner similar to how the angles are measured using a straight line (reference line) that connects the midpoint in the groove width direction at the starting point of the groove and the midpoint in the groove width direction at the end point of the grooves that define the regions. The area is the area of the first block 41 (the road contact surface not including the grooves) divided by the reference line. Additionally, in a configuration in which the first lateral narrow grooves 51B terminate without reaching the first circumferential narrow groove 51A, as illustrated in FIG. 5, the regions are determined to be sectioned by the reference line of the first lateral narrow grooves 51B extended to the first circumferential narrow groove 51A.

In an embodiment of the present technology, the first circumferential narrow groove 51A, the set of two first lateral narrow grooves 51B, and the first lateral auxiliary groove 51C are formed as described above in at least the first blocks 41, and the inclination angle of the grooves, the area of the regions that divide the grooves, and other characteristics are set. However, the configuration of portions other than the first blocks 41 are not limited by the embodiment described above. In other words, if at least the first block 41 have the configuration described above, excellent wet performance and snow performance can be obtained, and uneven wear especially of the first blocks 41 can be suppressed.

However, in an embodiment of the present technology, as in the tread pattern of FIG. 2 described above, the first main groove 11 is preferably disposed on the inner side of the second main groove 12 with respect to the vehicle when the tire is mounted on the vehicle and the third main groove 13 is preferably disposed outward (on the outer side with respect to the vehicle when the tire is mounted on vehicle) of the second main groove 12. By having such a configuration, the rigidity of the land portions on either side of the second main groove 12 disposed on the outer side with respect to the vehicle when the tire is mounted on the vehicle can be ensured, and steering stability can further effectively be improved. Furthermore, in a configuration with the main grooves disposed as such, the groove width of the second main groove 12 is preferably less than the groove width of the first main groove 11. By setting the groove widths of the first main groove 11 and the second main groove 12 in such a manner, the rigidity of the land portions on either side of the second main groove 12 can be ensured, and steering stability can be improved.

In a tire with the configuration for the main grooves described above, the second blocks 42 preferably have the configuration described above. In other words, the second circumferential narrow groove 52A that extends in the tire circumferential direction and the second lateral auxiliary groove 52B that extends in the tire width direction are preferably provided. Providing the second circumferential narrow groove 52A and the second lateral auxiliary groove 52B in such a manner is advantageous because good wet performance, snow performance, and uneven wear resistance performance can be achieved in a compatible manner.

In particular, by providing the second lateral auxiliary groove 52B, drainage performance provided by the second lateral auxiliary groove 52B can be obtained while the rigidity of the second blocks 42 can be maintained and wet performance can be improved. By the first main groove 11 and the second main groove 12 having the configuration of the example illustrated, the first lateral auxiliary groove 51C and the second lateral auxiliary groove 52B open to the second main groove 12 disposed on the outer side with respect to the vehicle when the tire is mounted on the vehicle. As a result, wet performance can be increased.

In the example illustrated, the second lateral narrow groove 52C extends in the tire width direction from the end portion of the second lateral auxiliary groove 52B. By further providing the lateral narrow groove 52B in such a manner, the second block 42 is divided by the second lateral auxiliary groove 52B and the second lateral narrow groove 52C. As a result, wet performance can be further effectively improved.

Additionally, by providing the second circumferential narrow groove 52A, the rigidity of the second blocks 42 is brought close to that of the first blocks 41 with the difference in rigidity between first blocks 41 and second blocks 42 adjacent in the tire width direction decreasing. As a result, the ground contact pressure of the first blocks 41 and the second blocks 42 can be made uniform and uneven wear can be suppressed.

The second circumferential narrow groove 52A may extend in the tire circumferential direction in a linear manner; however, it preferably extends in a curved manner as illustrated. This allows wear resistance performance to be improved.

The third circumferential auxiliary groove 53A formed in the third land portion 23 preferably extends in the tire circumferential direction with a zigzag shape, and has a smaller groove width than the first main groove 11, the second main groove 12, the third main groove 13, and the fourth main groove 14 as illustrated. By the third circumferential auxiliary groove 53A having such a configuration, the edge effect provided by the zigzag shape produces an effect of improving the braking performance on snowy road surfaces and collapsing in the tire width direction at the third land portion 23 can be prevented. As a result, the rigidity of the third land portion 23 can be improved, and the steering stability on dry road surfaces can be improved.

The outer shoulder narrow grooves 54A and the inner shoulder narrow grooves 55A provided in the outer shoulder blocks 44 and the inner shoulder blocks 45, in particular, preferably extend in the tire width direction with a zigzag shape as illustrated. By the outer shoulder narrow grooves 54A and the inner shoulder narrow grooves 55A having such a configuration, at the outer shoulder blocks 44 and the inner shoulder blocks 45, the braking performance on snowy road surfaces provided by the edge effect is improved, and collapsing of the outer shoulder blocks 44 and the inner shoulder blocks 45 in the tire circumferential direction can be prevented. As a result, block rigidity can be improved and steering stability on dry road surfaces can be improved.

EXAMPLES

Thirteen types of pneumatic tires, Conventional Example 1, Comparative Example 1, and Examples 1 to 11 were manufactured. The manufactured pneumatic tires had a tire size of 205/55R16 91V, the cross sectional shape illustrated in FIG. 1, the tread pattern illustrated in FIG. 2 as a base, and set with the values listed in Table 1 for the following parameters: presence of first circumferential auxiliary groove, type of groove that opens to the inner side with respect to the vehicle when the tire is mounted on the vehicle (vehicle inner side), type of groove that opens to the outer side with respect to the vehicle when the tire is mounted on the vehicle (vehicle outer side), angle α formed by the set of lateral narrow grooves, angle β formed by the first circumferential narrow groove and the first lateral auxiliary groove, the ratio of the area of the region with the smallest area of the five regions divided by the first circumferential narrow groove and the set of lateral narrow grooves and the first lateral auxiliary groove to the area of the region with the largest area (largest area/smallest area ratio), groove width of the first main groove, groove width of the second main groove, presence of the second lateral auxiliary groove, presence of the second circumferential auxiliary groove.

Note that the Comparative Example 1 has substantially the same tread pattern as Example 1; however, the groove that opens to the vehicle inner side (first lateral narrow groove in an embodiment of the present technology) is an auxiliary groove with a groove width greater than the narrow grooves.

The 13 types of pneumatic tires were evaluated for wet performance, snow performance, and wear resistance performance by the evaluation methods described below, and the results are also shown in Table 1.

Wet Performance

The test tires were mounted on wheels with a rim size of 16×6.5 JJ, inflated to an air pressure of 200 kPa, and mounted on a front wheel drive passenger vehicle (test vehicle) with an engine displacement of 1.6 L. A driving test was performed by a test driver on a wet road surface test course with a 1 mm deep film of water. The distance (braking distance) was measured from the point where the brakes were applied at an initial speed of 100 km/h to the point where the vehicle came to a stop. The evaluation results were expressed, using the inverse value of the measurement value, as index values with the results of Conventional Example 1 being defined as 100. Larger index values indicate shorter braking distances on wet road surfaces and superior wet performance.

Snow Performance

The test tires were mounted on wheels with a rim size of 16×6.5 JJ, inflated to an air pressure of 200 kPa, and mounted on a front wheel drive passenger vehicle (test vehicle) with an engine displacement of 1.6 L. A driving test was performed by a test driver on a compacted snow road surface test course. The distance (braking distance) was measured from the point where ABS braking was applied at an initial speed of 40 km/h to the point where the vehicle came to a stop. The evaluation results were expressed, using the inverse value of the measurement value, as index values with the results of Conventional Example 1 being defined as 100. Larger index values indicate shorter braking distances on snowy road surfaces and superior snow performance.

Wear Resistance Performance

The test tires were mounted on wheels with a rim size of 16×6.5 JJ, inflated to an air pressure of 200 kPa, and mounted on a front wheel drive passenger vehicle (test vehicle) with an engine displacement of 1.6 L. After the vehicle was driven for 50000 km at an average speed of 80 km/h, the difference in degree of wear was measured. The evaluation results were expressed, using the inverse value of the measurement value, as index values with the results of Conventional Example 1 being defined as 100. Larger index values indicate less difference in degree of wear and superior wear resistance.

TABLE 1

| | | Conventional Example 1 | Comparative Example 1 | Example 1 | Example 2 | Example 3 | Example 4 |
|---|---|---|---|---|---|---|---|
| First land portion | Presence of first circumferential narrow groove | No | Yes | Yes | Yes | Yes | Yes |
| | Type of groove opening to vehicle inner side | Narrow groove | Auxiliary groove | Narrow groove | Narrow groove | Narrow groove | Narrow groove |

TABLE 1-continued

|  |  |  |  |  |  |  |  |
|---|---|---|---|---|---|---|---|
|  | Type of groove opening to vehicle outer side | Auxiliary groove | Auxiliary groove | Auxiliary groove | Auxiliary groove | Auxiliary groove | Auxiliary groove |
|  | Angle α ° | 0 | 0 | 0 | 0 | 10 | 30 |
|  | Angle β ° | 30 | 30 | 30 | 30 | 30 | 30 |
|  | Largest area/smallest area ratio | 2.0 | 2.0 | 2.0 | 2.0 | 2.0 | 2.0 |
| Main groove | Groove width mm of first main groove | 7 | 7 | 7 | 8 | 8 | 8 |
|  | Groove width mm of second main groove | 7 | 7 | 7 | 6 | 6 | 6 |
| Second land portion | Presence of second lateral auxiliary groove | No | No | No | No | No | No |
|  | Presence of second circumferential narrow groove | No | No | No | No | No | No |
| Wet performance | Index value | 100 | 101 | 100 | 100 | 100 | 100 |
| Snow performance | Index value | 100 | 103 | 102 | 102 | 102 | 102 |
| Uneven wear resistance performance | Index value | 100 | 98 | 100 | 101 | 101 | 102 |

|  |  | Example 5 | Example 6 | Example 7 | Example 8 | Example 9 | Example 10 | Example 11 |
|---|---|---|---|---|---|---|---|---|
| First land portion | Presence of first circumferential narrow groove | Yes | Yes | Yes | Yes | Yes | Yes | Yes |
|  | Type of groove opening to vehicle inner side | Narrow groove | Narrow groove | Narrow groove | Narrow groove | Narrow groove | Narrow groove | Narrow groove |
|  | Type of groove opening to vehicle outer side | Auxiliary groove | Auxiliary groove | Auxiliary groove | Auxiliary groove | Auxiliary groove | Auxiliary groove | Auxiliary groove |
|  | Angle α ° | 50 | 30 | 30 | 30 | 30 | 30 | 30 |
|  | Angle β ° | 30 | 45 | 50 | 50 | 50 | 50 | 50 |
|  | Largest area/smallest area ratio | 2.0 | 2.0 | 2.0 | 1.7 | 1.5 | 1.5 | 1.5 |
| Main groove | Groove width mm of first main groove | 8 | 8 | 8 | 8 | 8 | 8 | 8 |
|  | Groove width mm of second main groove | 6 | 6 | 6 | 6 | 6 | 6 | 6 |
| Second land portion | Presence of second lateral auxiliary groove | No | No | No | No | No | Yes | Yes |
|  | Presence of second circumferential narrow groove | No | No | No | No | No | No | Yes |
| Wet performance | Index value | 100 | 100 | 100 | 100 | 100 | 101 | 101 |
| Snow performance | Index value | 101 | 102 | 102 | 102 | 102 | 103 | 104 |
| Uneven wear resistance performance | Index value | 103 | 102 | 103 | 103 | 104 | 104 | 104 |

As is clear from Table 1, Examples 1 to 11 all achieved improved snow performance and uneven wear resistance performance in a compatible manner while maintaining wet performance to a high degree. Comparative Example 1 included an auxiliary groove as the groove that opens to the vehicle inner side (expressed from a different perspective, the groove width of the first circumferential narrow groove is excessively large), thus uneven wear resistance performance deteriorated.

The invention claimed is:

1. A pneumatic tire, comprising:
a first main groove and a second main groove that extend in a tire circumferential direction formed in a tread portion side by side in a tire width direction;
a first land portion defined between the first main groove and the second main groove, the first land portion being on a tire equator;
a plurality of first lug grooves that extend in the tire width direction disposed in the first land portion at intervals in the tire circumferential direction, each of the plurality of first lug grooves communicating with the first main groove and the second main groove at both ends; and
a plurality of first blocks formed by the plurality of first lug grooves defining the first land portion;
each of the plurality of first blocks comprising:
a first circumferential narrow groove that extends in the tire circumferential direction with at least one end communicating with one of the first lug grooves,
a set of two lateral narrow grooves that extend in the tire width direction with one end communicating with the first main groove,
a first lateral auxiliary groove that extends in the tire width direction with a first end communicating with the second main groove and a second end communicating with the first circumferential narrow groove, the second end of the first lateral auxiliary groove being disposed at a position in the tire circumferential direction between end portions of the set of lateral narrow grooves proximal to the first circumferential narrow groove; wherein
in each of the plurality of first blocks, an area of a region with the largest area out of five regions divided by the first circumferential narrow groove, the set of lateral narrow grooves, and the first lateral auxiliary groove is equal to or less than 1.7 times an area of a region with the smallest area.

2. The pneumatic tire according to claim 1, wherein the set of lateral narrow grooves are inclined so that a distance between one another increases from an end portion of the lateral narrow grooves proximal to the first main groove toward an end portion proximal to the first circumferential narrow groove, and form an angle α that ranges from 10° to 50°.

3. The pneumatic tire according to claim 1, wherein an angle β formed by the first circumferential narrow groove and the first lateral auxiliary groove is 45° or greater.

4. The pneumatic tire according to claim 1, wherein the first main groove is disposed on an inner side of the second main groove with respect to a vehicle when the tire is mounted on the vehicle.

5. The pneumatic tire according to claim 1, wherein the second main groove has a smaller groove width than the first main groove.

6. The pneumatic tire according to claim 5, wherein the set of lateral narrow grooves are inclined so that a distance between one another increases from an end portion of the lateral narrow grooves proximal to the first main groove toward an end portion proximal to the first circumferential narrow groove, and form an angle α that ranges from 10° to 50°.

7. The pneumatic tire according to claim 6, wherein an angle β formed by the first circumferential narrow groove and the first lateral auxiliary groove is 45° or greater.

8. The pneumatic tire according to claim 1, further comprising:
a third main groove that extends in the tire circumferential direction at a position outward from the second main groove in the tire width direction, the third main groove having a larger groove width than the second main groove;
a second land portion defined between the second main groove and the third main groove disposed side by side in the tire width direction;
a plurality of second lug grooves that extend in the tire width direction disposed in the second land portion at intervals in the tire circumferential direction, each of the plurality of second lug grooves communicating with the second main groove and the third main groove at both ends; and
a plurality of second blocks formed by the plurality of second lug grooves defining the second land portion, each of the second blocks comprising:
a second lateral auxiliary groove that extends in the tire width direction with one end communicating with the second main groove.

9. The pneumatic tire according to claim 8, wherein each of the plurality of second blocks comprises a second circumferential narrow groove that extends in the tire circumferential direction and intersects the second lateral auxiliary groove.

* * * * *